(12) United States Patent
Burchfield

(10) Patent No.: US 7,421,420 B2
(45) Date of Patent: Sep. 2, 2008

(54) METHOD FOR DEVICE SELECTION

(75) Inventor: Robert Douglas Burchfield, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 10/436,797

(22) Filed: May 13, 2003

(65) Prior Publication Data

US 2004/0230579 A1 Nov. 18, 2004

(51) Int. Cl.
*G06F 17/30* (2006.01)
(52) U.S. Cl. ............................................. 707/1; 707/2
(58) Field of Classification Search .................. 707/1–2; 713/1; 714/4, 3; 709/100; 711/111
See application file for complete search history.

(56) References Cited

U.S. PATENT DOCUMENTS

| | | | |
|---|---|---|---|
| 5,287,459 A | 2/1994 | Gniewek | |
| 6,061,309 A | 5/2000 | Gallo et al. | |
| 6,298,439 B1 * | 10/2001 | Beglin | ............................ 713/1 |
| 6,328,766 B1 | 12/2001 | Long | |
| 6,604,165 B1 * | 8/2003 | Terao | ............................ 711/5 |
| 2002/0116506 A1 * | 8/2002 | Lautner | ...................... 709/229 |
| 2003/0079156 A1 * | 4/2003 | Sicola et al. | .................... 714/4 |

* cited by examiner

*Primary Examiner*—Don Wong
*Assistant Examiner*—Sheree N Brown
(74) *Attorney, Agent, or Firm*—Rabindranath Dutta; Konrad Raynes & Victor, LLP

(57) ABSTRACT

Provided are a method, system, and article of manufacture for device selection. A command is generated in a host, wherein the command is for a library manager not directly connected to the host. A device is selected from a subsystem in a storage library based on a preference order, wherein the storage library is coupled to the host and the library manager. The command is sent from the host to the selected device for communicating with the library manager.

10 Claims, 6 Drawing Sheets

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 0100 | 0101 | 0102 | 0103 | 0104 | 0105 | 0106 | 0107 | | | | | | | | |
| 2 | 0110 | 0111 | 0112 | 0113 | | | | | | | | | | | | |
| 3 | 0120 | 0121 | | | | | | | | | | | | | | |
| 4 | 0130 | 0131 | 0132 | 0133 | 0134 | 0135 | 0136 | 0137 | 0138 | 0139 | 013A | 013B | 013C | 013D | 013E | 013F |
| 5 | 0140 | 0141 | 0142 | 0143 | 0144 | 0145 | | | | | | | | | | |
| 6 | 0150 | 0151 | | | | | | | | | | | | | | |
| 7 | 01A0 | | 01A2 | 01A3 | | | | | | | | | | | | |
| 8 | 01C0 | 01C1 | 01C2 | 01C3 | 01C4 | 01C5 | 01C6 | 01C7 | 01C8 | 01C9 | | | | | | |
| 9 | 01D0 | 01D1 | | | | | | | | | | | | | | |
| 10 | 01D4 | 01D5 | | | | | | | | | | | | | | |
| 11 | 01E1 | 01E4 | 01E5 | | | | | | | | | | | | | |
| 12 | 01F0 | 01F1 | | | | | | | | | | | | | | |
| 13 | 0160 | | 0162 | 0163 | 0164 | 0165 | | | | | | | | | | |
| 14 | 0166 | 0167 | | | | | | | | | | | | | | |
| 15 | 0168 | 0169 | 0170 | 0171 | 0172 | 0173 | 0174 | 0175 | 0176 | 0177 | 0178 | 0179 | 0180 | 0181 | 0182 | 0183 |
| 16 | 0184 | 0185 | 0186 | | | | | | | | | | | | | |

| SUB-SYSTEMS | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| MAX | 16 | 8 | 5 | 4 | 3 | 2 | 2 | 2 | 1 | 1 | 1 | 1 | 1 | 1 | 1 | 1 |
| TOTAL | 16 | 16 | 15 | 16 | 15 | 12 | 14 | 16 | 9 | 10 | 11 | 12 | 13 | 14 | 15 | 16 |

FIG. 4

METHOD FOR DEVICE SELECTION

BACKGROUND OF THE INVENTION

1. Field of the Invention

The present invention relates to a method, system, and an article of manufacture for device selection.

2. Description of the Related Art

A host system may perform input/output (I/O) operations with respect to a storage library by performing I/O operations with a set of devices in the storage library. A library manager coupled to the storage library may manage the storage library and the devices in the storage library. In certain implementations, the storage library may be a tape library and the devices may be tape devices. For any tape device, the tape device may first be online, then the tape device may be allocated to a job, and then the tape device may be started to process the I/O related to the job.

For instance, IBM* 3494 and IBM 3495 tape libraries include a library manager component that may manage up to 256 tape devices within the tape library. The tape devices are grouped into subsystems, and each subsystem may include up to 16 devices. A tape library may include from 1 to 16 subsystems, for a maximum of 256 devices.

*IBM is a trademark of International Business Machines Corp.

Besides the normal input/output (I/O) operations from the host to specific devices in the storage library for reading from the tape and writing on the tape, there is a need to issue commands that are referred to as library manager commands from the host to the library manager. For example, a library manager command from the host may request the library manager to return information on the inventory of a certain type of volumes in the tape library.

However, in certain implementations, there may be no direct communication path from the operating system on the host to the library manager. When there is no direct communication path from the host to the library manager, the library manager commands may be sent from the host to a tape device in the tape library, and the tape device then passes the library manager command to the library manager. Any tape device in the tape library may be used to pass the command. There is an need in the art for an implementation that selects an appropriate tape device for passing the library manager commands to the library manager.

SUMMARY OF THE PREFERRED EMBODIMENTS

Provided are a method, system, and article of manufacture for device selection. A command is generated in a host, wherein the command is for a library manager not directly connected to the host. A device is selected from a subsystem in a storage library based on a preference order, wherein the storage library is coupled to the host and the library manager. The command is sent from the host to the selected device for communicating with the library manager.

In additional implementations, the selection is restricted by limiting a number of devices that are eligible for selection from the subsystem, wherein a previously selected device has failed to communicate one command from the host to the library manager.

In certain implementations, the preference order prefers online devices to offline devices. In other implementations, the preference order prefers unallocated devices to allocated devices. In yet other implementations, the preference order prefers devices that do not have I/O started to devices that have I/O started.

In additional implementations, a notification is received that a previously chosen device in the storage library has failed. A new device is selected that is different from the previously chosen device for sending one command from the host to the library manager, via the new device.

In further implementations, a number of retries of devices from a first subsystem are limited, wherein a previous device selected in the first subsystem has failed to communicate the command to the library manager.

In yet additional implementations, a total number of retries for devices in the storage library that are performed for recovery from a communications failure to the library manager via the storage library are limited.

The implementations ensure that a tape device is optimally selected in a tape library for transmitting commands from a host system to a library manager. The implementations increases the performance of the system by selecting a next tape drive that limits the likelihood of a communications failure to the library manager, when recovering from a communication failure to the library manager caused by the selection of a previous tape drive.

BRIEF DESCRIPTION OF THE DRAWINGS

Referring now to the drawings in which like reference numbers represent corresponding parts throughout:

FIG. 2 illustrates a block diagram of subsystems with storage devices, in accordance with certain described implementations of the invention;

FIG. 4 illustrates a block diagram of a range of maximum retries for selection per subsystem, in accordance with certain described implementations of the invention;

DETAILED DESCRIPTION OF THE PREFERRED EMBODIMENTS

In the following description, reference is made to the accompanying drawings which form a part hereof and which illustrate several implementations. It is understood that other implementations may be utilized and structural and operational changes may be made without departing from the scope of the present implementations.

Figure 1:
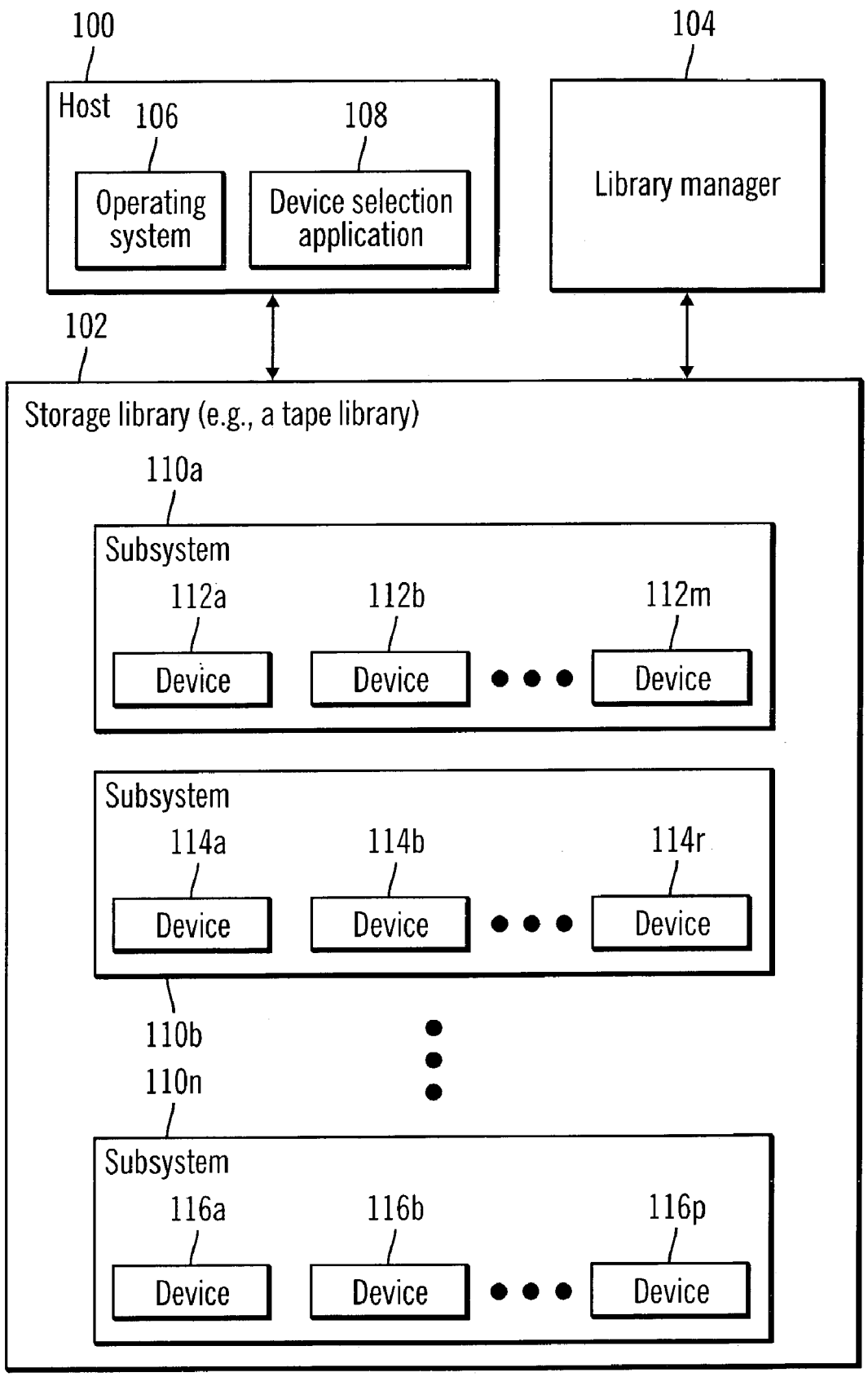
FIG. 1 illustrates a block diagram of a computing environment, in accordance with certain described aspects of the invention.

FIG. 1 illustrates a block diagram of a computing environment, in accordance with certain described aspects of the invention. A host 100 is connected to a storage library 102. The storage library 102 is connected to a library manager 104. However, the host 100 and the library manager 104 may not directly communicate with each other without transmitting commands via the storage library 102.

The host 100 may connect to the storage library 102 through a host data interface channel or any other direct connection or switching mechanism known in the art (e.g., fibre channel, Storage Area Network (SAN) interconnections, etc.). The host 100 may be any computational device known in the art, such as a personal computer, a workstation, a server, a mainframe, a hand held computer, a palm top computer, a telephony device, network appliance, etc. The host 100 may include any operating system 106 known in the art, and a device selection application 108 that selects devices in the storage library 102.

In certain implementations, the storage library 102 may be a tape library. The storage library is comprised of a plurality of subsystems 110a, 110b, . . . 110n, where each subsystem comprises a plurality of devices. For example, subsystem 110a may include a plurality of devices 112a . . . 112m, subsystem 10b may include a plurality of devices 114a . . . 114r, and subsystem 110c may include a plurality of device 116a . . . 116p. The number of devices in different subsystems may be same or different. In certain implementations, where the storage library 102 is a tape library, the devices are tape drives.

The library manager 104 may be implemented in a computational device (not shown) or any other hardware device (not shown) known in the art and manage the devices in the storage library 102. In certain implementations, the library manager 104 is connected to the storage library 102 but is not connected directly to the host 100. Therefore, the host 100 may send library manager commands to the library manager 104 by selecting a device in one of the subsystems 110a . . . 110n in the storage library 102 and sending the library manager command to the library manager 104 via the selected device.

Therefore, FIG. 1 illustrates how a host 100 sends library manager commands to the library manager 104 via a device in the storage library 102.

FIG. 2 illustrates a block diagram of exemplary subsystems with exemplary storage devices implemented in the storage library 102, in accordance with certain described implementations of the invention. A table 200 illustrates exemplary devices located in exemplary subsystems, where the exemplary subsystems comprise the storage library 102.

The first column of table 200 indicates sixteen subsystems labeled "1" through "16". The second through the seventeenth column of each row the table 200 indicate the identification number of the devices present in the subsystem corresponding to the row number. For example, row nine has two devices with identification number "01D0" and "01D1".

Table 200 indicates that the storage library 102 comprises sixteen subsystems where a subsystem may have a maximum of sixteen devices, although it is not required for each subsystem to have the maximum of sixteen devices. In alternative implementations, the number of subsystems and the number of devices in the storage library 102 may vary.

When the host 100 wants to send a library manager command to the library manager 104, the device selection application 108 in the host 100 selects a device in one of the subsystems "1" through "16" in table 200. For example, device selection application 108 may select the device with identification number "01D0" present in subsystem "9" for sending the library manager command to the library manager 104.

A number of techniques may be used by the device selection application 108 for selecting a device. For example, the device selection application 108 may select the first (lowest numbered) device in the storage library 102 for all library manger communications. For instance, in table 200, the device selection application 108 may select the device with identification number "0100". If communications with the library manger 104 should fail using the selected device, the next lowest numbered device could be chosen. For example, the device selection application 108 may select the device with identification number "0101" after selecting the device with identification number "0100" that resulted in a failure in communications. One problem with such a selection technique is that all library manger commands may use the same device, which is poor use of the available bandwidth. Also, if the selected device was allocated to a job and busy performing reads and writes, the library manager 104 command would complete for the time of the selected device.

In another implementation, the device selection application 108 selects a new device for a new library manager command. The implementations also attempt to select devices that are not busy. The device selection application 108 further considers performance and reliability of recovery from errors, when selecting a device. For example, if a fault is generated when device "01D0" is chosen then the device selection application 108 has to select a different device for reliability. Faults may be generated because of a variety of reasons, including channel failure during communication via the selected device "01D0".

Therefore, FIG. 2 illustrates an exemplary set of subsystems and devices included in the storage library 102 via which library manager commands are transmitted from the host 100 to the library manager 104 by the device selection application 108.

Figure 3:
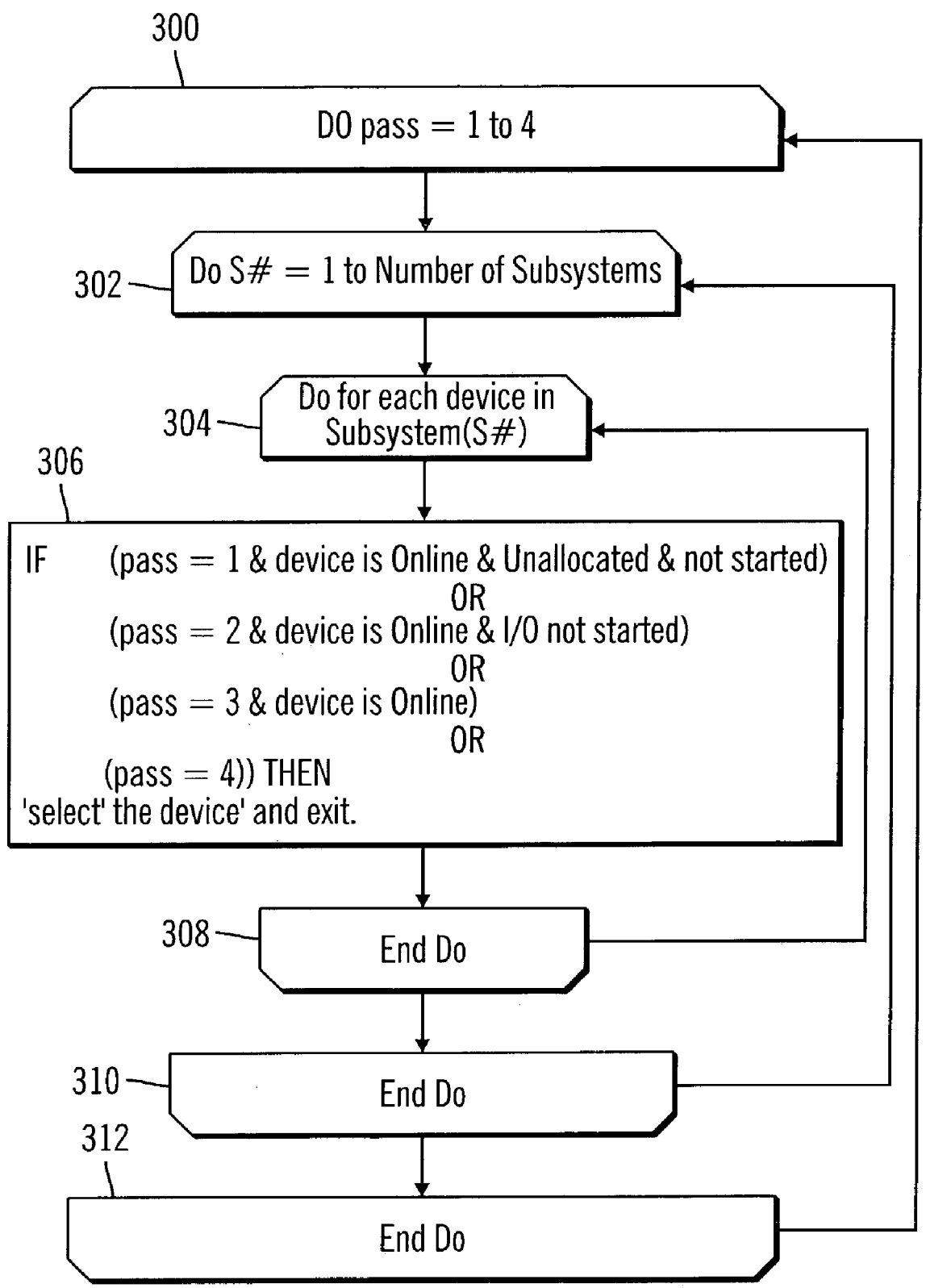
FIG. 3 illustrates a first logic for selecting devices, in accordance with certain described implementations of the invention.

FIG. 3 illustrates a first logic for selecting devices implemented in the host 100, in accordance with certain described implementations of the invention. The device selection application 108 implemented in the host 100 performs the logic illustrated in FIG. 3. The logic is for selecting an appropriate device once the host 100 has generated a library manager command.

Control starts at block 300, from where the device selection application 108 may perform four repeated passes of blocks 300 to 312 in a DO loop. In block 300, the device selection application 108 executes a "DO" control statement with a variable "pass" starting from 1 and extending till 4.

Control proceeds to block 302, where the device selection application 108 performs repeated executions of the blocks 302 to 310 in a DO loop. In block 302, the device selection application 108 executes a "DO" control statement with a variable "S#" staring from 1 and extending to the total number of subsystems in the storage library 102.

Next, at block 304, the device selection application 108 performs repeated executions of the blocks 304 to 308 in a DO loop. In block 304, the device selection application 108 executes a "DO" control statement for each device in subsystem "S#".

The device selection application 108 checks (at block 306) for different conditions in different passes depending on the status of a device in a subsystem. In pass 1, if a device is online, unallocated and does not have I/O started then the device selection application 108 selects the device for transmitting the library manager command and exits from all the DO loops. In pass 2, if a device is online and does not have I/O started then the device selection application 108 selects the device for transmitting the library manager command and exits from all the DO loops. In pass 3, if a device is online, then the device selection application 108 selects the device for transmitting library manager command and exits from all the DO loops. In pass 4, the device selection application 108 selects the device for transmitting library manager command and exits from all the DO loops. Blocks 308, 310, and 312 are blocks indicating end statements corresponding to the DO control statements in blocks 304, 302, and 300 respectively.

Therefore the logic of FIG. 3 first selects an online device in preference to an offline device. An online device is more likely to be capable of transferring the library manager command than an offline device. An offline device may not even be connected to the host 100.

The logic of FIG. 3 further selects an unallocated device over an allocated device. The allocated device may be performing I/O related to a job for which the allocated device is allocated. If an allocated device is selected, the library manager command may have to compete with job related I/O.

The logic of FIG. 3, also selects a device without I/O started over a device that has I/O started. By selecting a device that doe not have I/O started the library command can be started immediately without waiting for a previously started I/O operation to complete.

In many implementations, the device selection application 108 will select a device and perform I/O associated with the library manager command. In certain cases, the I/O associated with the library manager command via the selected device, will be successful. However, if the I/O of the library manger command fails for reasons related to the device or a communications path associated with the device, another device may have to be selected. In certain implementations, the device selection application 108 may also select an optimal device for recovery from a failure of a library manager command.

In certain implementations, it is possible for hardware components in the storage library 102 to fail such that all the devices in one or more subsystems 110a . . . 110n will fail to communicate with the library manager 104, while devices in other subsystems are still able to communicate. Therefore, alternative implementations of the device selection application 108 may ensure that a single point of failure in the storage library 102 will not preclude finding a device that is capable of library manager communications.

FIG. 4 illustrates a block diagram of an exemplary range of maximum retries for selection per subsystem in the storage library 102, in accordance with certain described implementations of the invention.

The device selection application 108 may use sixteen as the maximum number of devices that will be used to issue a single library command to the library manager 104. If an error in one device, causes library manger communication to fail, a different device would be tried, up to a maximum of 16 different devices. In order to avoid the effects of a single storage library subsystem failure, 16 is divided by the number of library subsystems that have connectivity to the host 100. The result of the division by the number is used to limit the maximum number of retries per subsystem. For example, if only 4 subsystems are attached to the host 100, then a maximum number of 4 retries will be performed on each subsystem (because, 16/4=4). Therefore the device selection application 108, ensures that a single subsystem failure will not result in a library manager I/O failure.

FIG. 4 illustrates the range of maximum retries via a table 400. The first row (SUB-SYSTEMS) is the number of subsystems that include devices having connectivity between the host 100 and the storage library 102. The second row (MAX) is the maximum number of devices per subsystem that the device selection application 108 will use to attempt to recover from a failure. When the MAX number is reached for a subsystem, no more devices in that subsystem will be used for retry. The third row (TOTAL) is the total number of retries that will be done before an error is considered unrecoverable.

Therefore, the table 400 of FIG. 4 illustrates the range of maximum retries for recovery from a failure of library manager communications.

Figure 5:
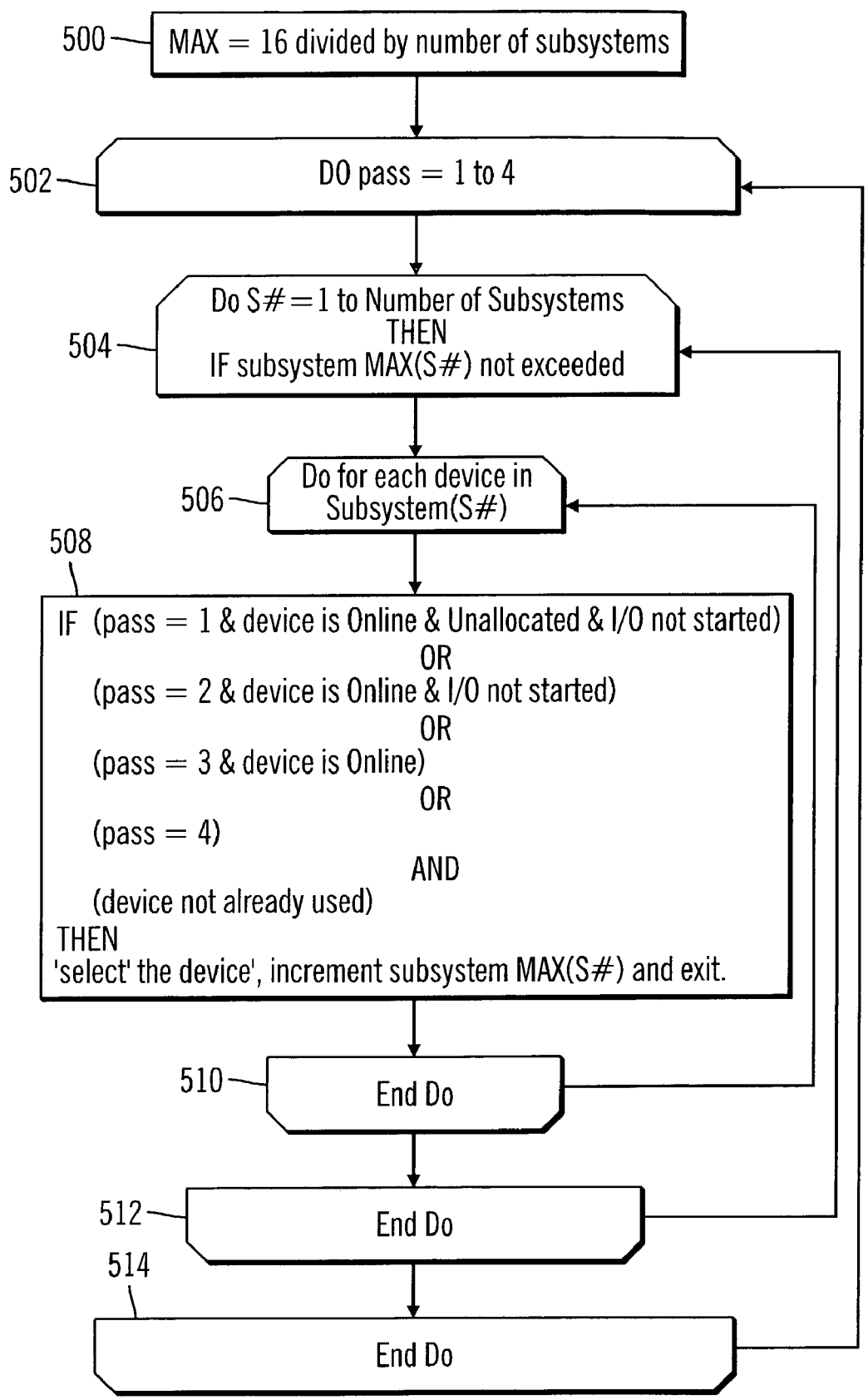
FIG. 5 illustrates a second logic for selecting devices, in accordance with certain described implementations of the invention.

FIG. 5 illustrates a second logic for selecting tape devices that includes the range of maximum retries for recovery from a failure, in accordance with certain described implementations of the invention. The logic of FIG. 5 is implemented in the device selection application 108 in the host 100, and includes added enhancements to the first logic of FIG. 3. The logic of FIG. 5 not only allows the best device to be selected but also allows the device selection application 108 to select the best device for recovery when a previously chosen device has failed. Logic is included to limit the number of devices that will be eligible for selection from any subsystem. When a device is selected, the device number may be saved in an array. The array may be used to ensure that a previously selected device will not be selected again. In addition, when a device is selected, a subsystem counter may be incremented to count how many devices have been selected from a subsystem.

The logic of FIG. 5 is for selecting an appropriate device once the host 100 has generated a library manager command. Control starts at block 500, where the device selection application 108 assigns the variable MAX to 16 divided by the number of subsystems.

Control proceeds to block 502, from where the device selection application 108 may perform four repeated passes of blocks 502 to 514 in a DO loop. In block 502, the device selection application 108 executes a "DO" control statement with a variable "pass" starting from 1 and extending till 4.

At block 504, the device selection application 108 executes a "DO" control statement with a variable "S#" starting from 1 and extending to the total number for subsystems in the storage library 102, selecting each subsystem. For each selected subsystem, if the maximum number of devices to be tried in the subsystem is not exceeded, then the device selection application 108 executes blocks 506 to 510.

Control proceeds to block 506, where the device selection application 108 performs repeated executions of the blocks 506 to 510 in a DO loop. At block 506, the device selection application 108 executes a "DO" control statement for each device in subsystem "S#".

At block 508, the device selection application 108 checks for different conditions in different passes depending on the status of a device. In pass 1, if a device is not already used, and if the device is online, unallocated and does not have I/O started then the device selection application 108 selects the device for transmitting the library manager command and exits from all the DO loops. In pass 2, if a device is not already used, and if the device is online and does not have I/O started then the device selection application 108 selects the device for transmitting the library manager command and exits from all the DO loops. In pass 3, if a device is not already used, and if the device is online then the device selection application 108 selects the device for transmitting the library manager command and exits from all the DO loops. In pass 4, if a device is not already used the device selection application 108 selects the device for transmitting the library manager command and exits from all the DO loops. Blocks 510, 512, and 514 are blocks indicating end statements corresponding to the DO control statements in blocks 506, 504, and 502 respectively.

Therefore, in the logic of FIG. 5 the device selection application chooses not only the best device for library manager commands but also limits the number of retries of devices in each subsystem for recovery from an error.

The implementations select a drive that generates the best performance for the overall system. At the same time, the implementations restrict the number of devices that may be retried in a particular subsystem of the storage library in the event of a failure of a library manager command. Therefore, the implementations ensure that an optimal tape device is selected in a tape library for transmitting commands from a host system to a library manager. The implementations further increases the performance of the system by selecting a next tape drive that reduces the likelihood of a fault, when recovering from a fault caused by the selection of a previous tape drive.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

Figure 6:
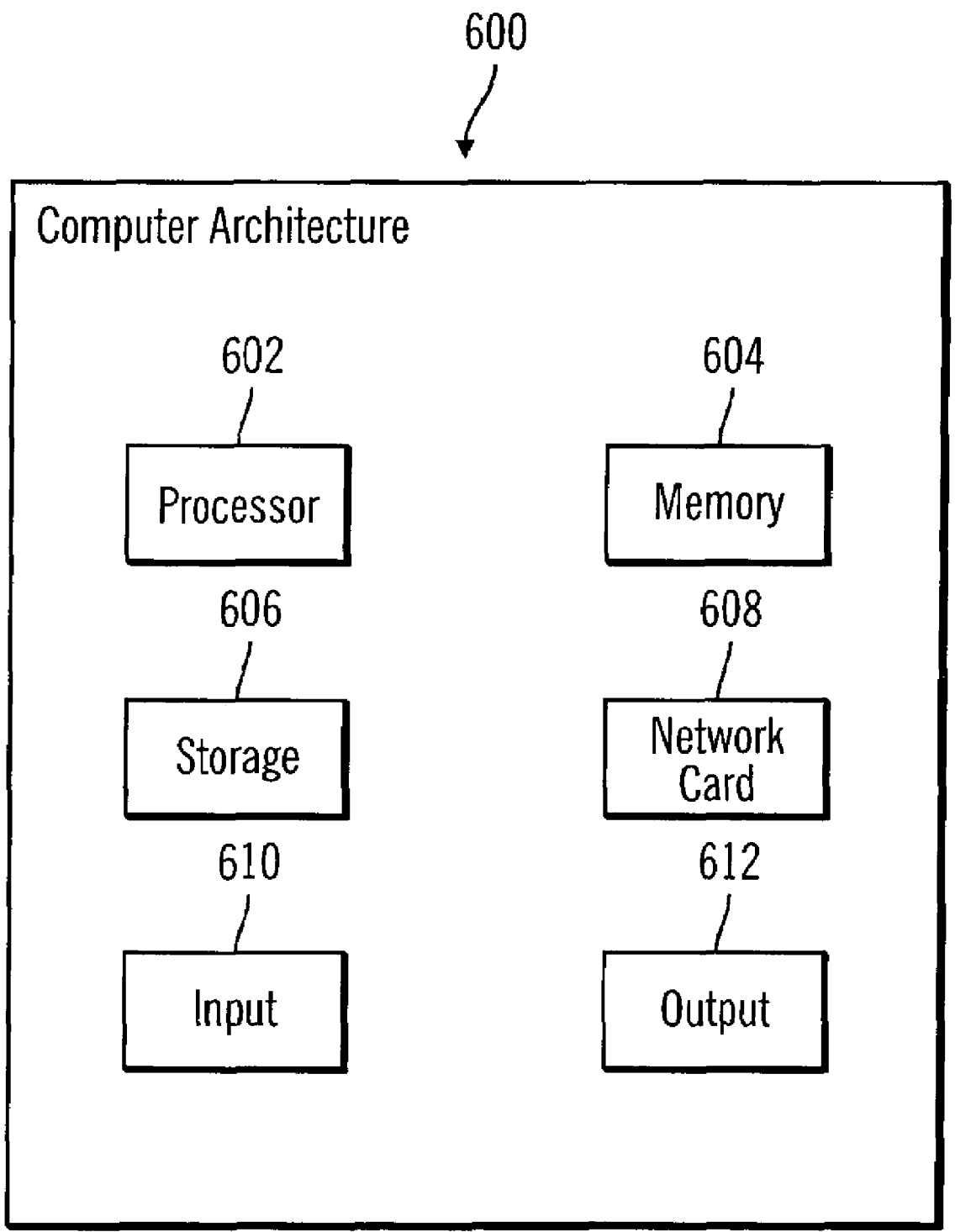
FIG. 6 illustrates a block diagram of a computer architecture in which certain described aspects of the invention are implemented.

FIG. 6 illustrates a block diagram of a computer architecture in which certain aspects of the invention are implemented. FIG. 6 illustrates one implementation of the host 100. The host 100 may implement a computer architecture 600 having a processor 602 (e.g., a microprocessor, such as the CPU 104), a memory 604 (e.g., a volatile memory device), and storage 606 (e.g., a non-volatile storage, magnetic disk drives, optical disk drives, tape drives, etc.). The storage 606 may comprise an internal storage device, an attached storage device or a network accessible storage device. Programs in the storage 606 may be loaded into the memory 604 and executed by the processor 602 in a manner known in the art. The architecture may further include a network card 608 to enable communication with a network. The architecture may also include at least one input 610, such as a keyboard, a touchscreen, a pen, voice-activated input, etc., and at least one output 612, such as a display device, a speaker, a printer, etc.

The logic of FIGS. 3 and 5 describe specific operations occurring in a particular order. Further, the operations may be performed in parallel as well as sequentially. In alternative implementations, certain of the logic operations may be performed in a different order, modified or removed and still implement implementations of the present invention. Moreover, steps may be added to the above described logic and still conform to the implementations. Yet further steps may be performed by a single process or distributed processes.

Many of the software and hardware components have been described in separate modules for purposes of illustration. Such components may be integrated into a fewer number of components or divided into a larger number of components. Additionally, certain operations described as performed by a specific component may be performed by other components.

Certain groups of elements shown in the figures have been labeled with reference numerals having an identical numeric prefix followed by the suffix "a", the suffix "b", or the suffix "n", etc. For example, the subsystems are labeled 110a, 110b, ... 110n and certain devices are labeled 116a, 116b, ... 116p. Labeling groups of elements in such a manner does not imply that different groups of elements contain an identical number of elements in each group. For example, the number of devices in each subsystem 110a ... 110n may be different.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for device selection, the method comprising:

generating a command in a host, wherein the command is for a library manager;

selecting, by a device selection application in the host, a device from a subsystem in a storage library based on a preference order, wherein the storage library is coupled to the host and the library manager; and sending the command from the host to the selected device for communicating with the library manager, wherein the command is stored in storage in the selected device, wherein the command from the host is communicated to the library manager by the selected device, wherein the host does not directly communicate with the library manager, wherein the command is communicated from the host to the selected device of the subsystem in the storage library and the selected device of the subsystem in the storage library then communicates the command to the library manager, wherein selecting the device from the subsystem in the storage library based on the preference order further comprises selecting online devices in preference to offline devices, wherein the subsystem is one of a plurality of subsystems included in the storage library, wherein in response to a failure of the selected device to communicate the command from the host to the library manager an alternative device from one of the plurality of subsystems is used for attempting to communicate the command from the host to the library manager, wherein a maximum number of devices from each of the subsystems of the plurality of subsystems that is configured for attempting to communicate the command from the host to the library manager is restricted to a predetermined number by limiting a number of retries of devices from a first subsystem to be a function of a number of subsystems having connectivity to the host, wherein computation of the function comprises dividing a predetermined maximum number of devices that is configured to issue a single command to the library manager by the number of subsystems having connectivity to the host, wherein a previous device selected in the first subsystem has failed to communicate the command to the library manager.

2. The method of claim 1, further comprising:

restricting the selection, by limiting a number of devices that are eligible for selection from the subsystem to the predetermined number, wherein a previously selected device has failed to communicate one command from the host to the library manager.

3. The method of claim 1, wherein selecting the device from the subsystem in the storage library based on the preference order further comprises selecting unallocated devices in preference to allocated devices without communicating with the library manager.

4. The method of claim 1, wherein selecting the device from the subsystem in the storage library based on the preference order further comprises selecting devices that do not have I/O started in preference to devices that have I/O started, and wherein those devices that have I/O started have yet to complete a previously started I/O operation and those devices that do not have I/O started are not waiting to complete any previously started I/O operation.

5. The method of claim 1, wherein selecting the device from the subsystem in the storage library based on the preference order further comprises selecting devices that are online, unallocated and do not have I/O started over devices that are online, allocated, and do not have I/O started, wherein those devices that have I/O started have yet to complete a previously started I/O operation and those devices that do not have I/O started are not waiting to complete any previously started I/O operation.

6. The method of claim 1, wherein selecting the device from the subsystem in the storage library based on the preference order further comprises selecting devices that are online and do not have I/O started over devices that are online and have I/O started, wherein those devices that have I/O started have yet to complete a previously started I/O operation and those devices that do not have I/O staffed are not waiting to complete any previously started I/O operation.

7. The method of claim 1, further comprising:
receiving a notification that a previously chosen device in the storage library has failed; and
selecting, by the device selection application in the host, a new device that is different from the previously chosen device for sending one command from the host to the library manager, via the new device.

8. The method of claim 1, further comprising:
limiting a total number of retries for devices in the storage library that are performed for recovery from a communications failure to the library manager via the storage library.

9. The method of claim 1, wherein the storage library is a tape library and the device is a tape device, and wherein the host determines the tape device to use to communicate the command to the library manager.

10. The method of claim 1, wherein the selected device is a tape device in the subsystem, wherein the command for the library manager is a library manager command, wherein the library manager is not directly communicating with the host, and wherein not directly communicating with the host comprises that the library manager command is sent from the host to the tape device and the tape device then sends the library manager command to the library manager.

* * * * *